United States Patent [19]
Gullberg

[11] Patent Number: 5,355,850
[45] Date of Patent: Oct. 18, 1994

[54] ADJUSTABLE FORCE TRANSMISSION ARRANGEMENT FOR A CAMSHAFT OF A BIG DIESEL ENGINE

[75] Inventor: Lars Gullberg, Vasa, Finland

[73] Assignee: Wartsila Diesel International Ltd. Oy, Helsinki, Finland

[21] Appl. No.: 197,288

[22] Filed: Feb. 15, 1994

[30] Foreign Application Priority Data

Feb. 16, 1993 [FI] Finland .................. 930669

[51] Int. Cl.⁵ .................. F01L 1/02; F01L 1/34
[52] U.S. Cl. .................. 123/90.31; 123/90.17; 74/568 R; 74/395
[58] Field of Search .................. 123/90.31, 90.17; 403/337, 338; 74/568 R, 395

[56] References Cited

U.S. PATENT DOCUMENTS

| | | | |
|---|---|---|---|
| 4,465,037 | 8/1984 | Tanaka | 123/90.31 |
| 4,671,223 | 6/1987 | Asano et al. | 123/90.31 |
| 4,955,335 | 9/1990 | Jingu et al. | 123/90.31 |
| 4,966,106 | 10/1990 | Aruga et al. | 123/90.31 |
| 5,014,655 | 5/1991 | Ampferer | 123/90.31 |
| 5,058,458 | 10/1991 | Odai | 123/90.31 |

FOREIGN PATENT DOCUMENTS 210004 9/1991 Japan .................. 123/90.31

*Primary Examiner*—E. Rollins Cross
*Assistant Examiner*—Weilun Lo
*Attorney, Agent, or Firm*—Smith-Hill and Bedell

[57] ABSTRACT

The invention relates to an adjustable force transmission arrangement in a big diesel engine for accomplishing force transmission from a crankshaft (9) of the engine by means of gear wheels to at least one camshaft (11). The arrangement includes a first gear wheel (1), which is in connection with the force transmission of the crankshaft (9), and a second gear wheel (2), which is in connection with the force transmission of the camshaft (11), said gear wheels (1,2) being arranged adjacent to each other and arranged in force transmitting connection with each other through a friction surface (5). In accordance with the invention the arrangement comprises a guiding element (3), which is supported by means of a separate slide bearing element (7) to the engine block (6) so that it is guided both in the radial and in the axial direction. The guiding element (3) is arranged to be fixed by means of one or several screw bolts (4) or the like to said first gear wheel (1) so that said second gear wheel (2) is positioned between the first gear wheel (1) and the guiding element (3) and receives from these pieces its guidance also in the radial direction.

4 Claims, 1 Drawing Sheet

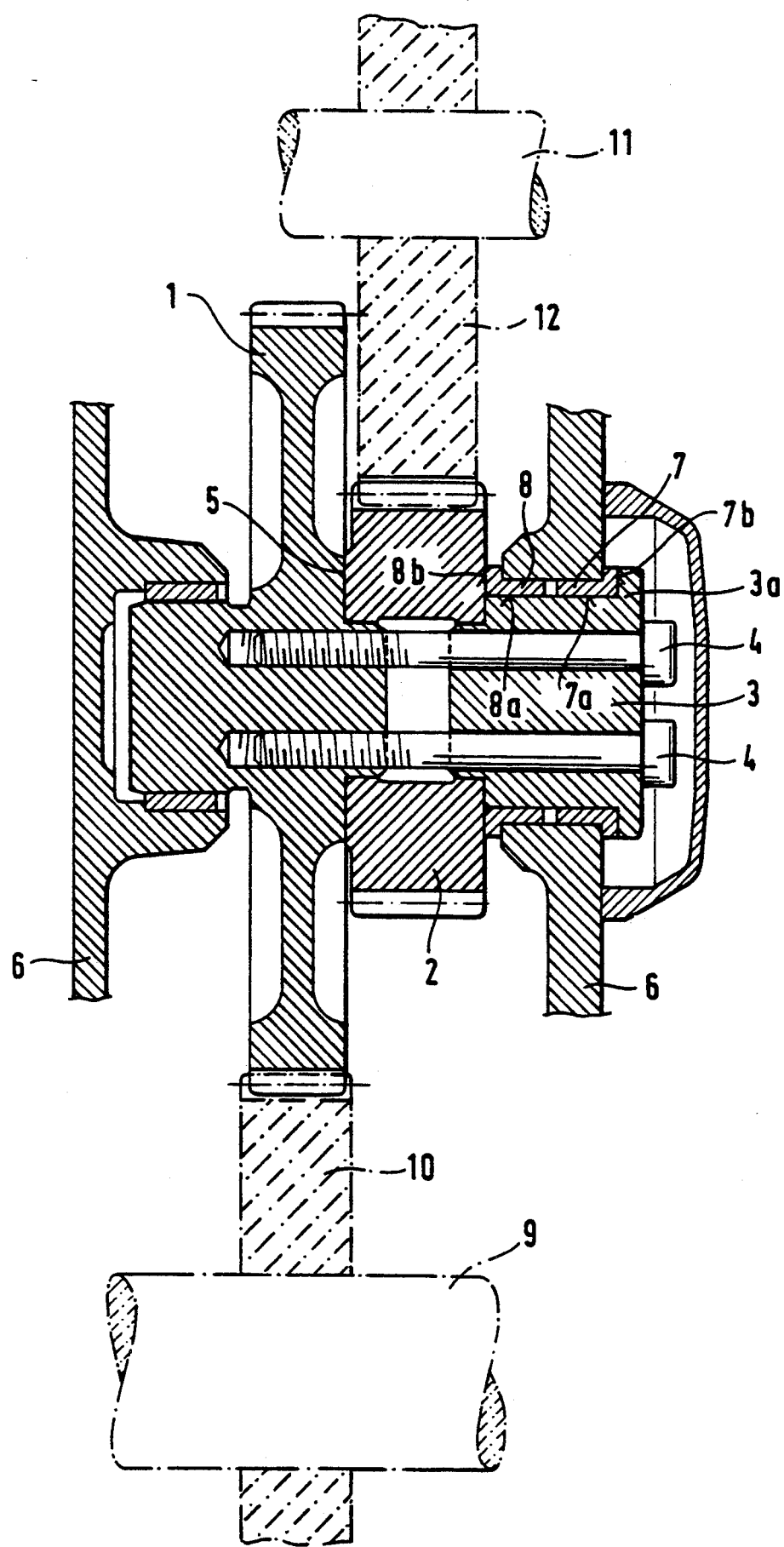

ADJUSTABLE FORCE TRANSMISSION ARRANGEMENT FOR A CAMSHAFT OF A BIG DIESEL ENGINE

The invention relates to an adjustable force transmission arrangement in a big diesel engine for accomplishing force transmission from a crankshaft of the engine by means of gear wheels to at least one camshaft.

A big diesel engine refers here to such engines, which are applicable for main propulsion engines or auxiliary engines for ships or for heating power plants.

Force transmission arrangements for a cam shaft are known, in which adjoining gear wheels are fixed to each other directly by means of screw bolts for accomplishing force transmission. In this case the turning angle of the cam shaft relative to the crankshaft can be changed by adjusting the mutual position of the gear wheels. For this purpose the holes arranged for the screw bolts have been made oval so that the position of the screw belts in the tangential direction of the gear wheels can be changed. The solution, however, provides only a relatively small adjustment allowance and in addition it is laborious to accomplish the actual adjustment measures.

Friction force transmission between the gear wheels, known as such, would make it possible to have a large adjustment allowance, but at the same time the measures needed for accomplishing the actual adjustment should be as simple as possible. Thus, an aim of the invention is to provide a solution based on friction force transmission and which is constructionally uncomplicated and reliable. Also the mutual attachment and detachment of the gear wheels as well as the adjustment of the mutual position thereof should be accomplished as simply as possible.

The arrangement according to the invention comprises a guiding element, which is supported by means of a separate slide bearing element to the engine block so that it is guided both in the radial and in the axial direction. In addition the guiding element is arranged to be fixed by means of one or several screw bolts or the like to said first gear wheel so that said second gear wheel is positioned between the first gear wheel and the guiding element and receives from these pieces its guidance also in the radial direction. Thus, as the guiding element itself is turnably journalled to the engine block and receives guidance both in the radial and in the axial direction, the force transmission arrangement is uncomplicated and reliable. At the same time detachment and tightening of the gear wheels to each other takes place in a simple way by means of said screw bolts from one end of the whole arrangement and due to the friction attachment the attachment allowance is as large as possible.

In practice the slide bearing element comprises a first bearing surface extending in the axial direction with regard to said gear wheels and a second bearing surface substantially perpendicular with regard to said first bearing surface. Correspondingly the guiding element is provided with a flange member extending in the radial direction and arranged in cooperation with said second bearing surface for guiding said gear wheels in the axial direction thereof.

In order to improve the guidance the arrangement includes also a second slide bearing element arranged between the engine block and said second gear wheel and arranged to guide said guiding element in the radial direction and in addition said second gear wheel in the axial direction.

The invention will now be further described, by way of example, with reference to the accompanying drawing, the only FIGURE of which shows an arrangement according to the invention as a section taken in the axial direction.

In the drawing 1 indicates a gear wheel, which is in connection with a crankshaft 9 of an engine by means of a gear wheel 10. Correspondingly, a gear wheel 2 is in connection with a camshaft 11 of the engine by means of a gear wheel 12. With the exception of the gear wheels 1 and 2 said force transmission arrangements and shafts are shown only schematically. Thus, in practice the force transmission can additionally include for instance one or several intermediate gear wheels when necessary.

The gear wheel 1 is mounted in bearings to an engine block 6. In addition the arrangement according to the invention includes a guiding element 3 which is as well mounted to the engine block 6 by means of slide bearing elements 7 and 8. Guidance for the guiding element 3 in the radial direction is accomplished by means of bearing surfaces 7a and 8a. In addition the guiding element 3 includes a flange member 3a, which receives guidance in the axial direction through a bearing surface 7b.

The guiding element 3 is tightened to the gear wheel 1 by means of screw bolts 4 so that the gear wheel 2 is positioned between the gear wheel 1 and the guiding element 3. Then force transmission occurs from the gear wheel 1 to the gear wheel 2 through a friction surface 5 therebetween. A bearing surface 8b in the slide bearing 8 guides the gear wheel 2 axially. The arrangement does not require any separate shaft, but the gear wheel 2 receives its guidance in the radial direction from the sleeve-like parts in the gear wheel 1 and in the guiding element 3.

The mutual position of the gear wheels 1 and 2 can be changed by loosening the screw bolts 4, whereby the friction surface 5 allows turning of the gear wheels relative to each other. As turning of the screw bolts 4 can be carried out from the end of the entire arrangement, unfastening and adjustment can easily be accomplished.

The number of the screw bolts 4 is not decisive. The main thing is that a sufficiently even load is exerted on the friction surface 5. Thus, in principle, even one screw bolt positioned axially in the center is enough, when only it is possible therethrough to provide a sufficient tightening force, so that force transmission between the gear wheels 1 and 2 is secured.

Hence, the invention is not limited to the embodiment shown, but several modifications are feasible within the scope of the attached claims.

I claim:

1. An adjustable force transmission arrangement in a big diesel engine for accomplishing force transmission from a crankshaft (9) of the engine by means of gear wheels to at least one camshaft (11), the arrangement including a first gear wheel (1), which is in force transmitting connection with the crankshaft (9), and a second gear wheel (2), which is in force transmitting connection with the camshaft (11), said gear wheels (1,2) being arranged adjacent to each other and arranged in force transmitting connection with each other through a friction surface (5), the arrangement comprising further a guiding element (3), which is supported by means of a separate slide bearing element (7) to the engine block (6)

so that the guiding element is guided both radially and axially with respect to said gear wheels, the guiding element (3) being arranged to be fixed by means of at least one fastening member (4) to said first gear wheel (1) so that said second gear wheel (2) is positioned between the first gear wheel (1) and the guiding element (3), and the second gear wheel receives radial guidance from the first gear wheel and the guiding element.

2. A force transmission arrangement according to claim 1, wherein the slide bearing element (7) comprises a first bearing surface (7a) extending in the axial direction with regard to said gear wheels (1,2) and a second bearing surface (7b) substantially perpendicular with regard to said first bearing surface (7a), the guiding element (3) being provided with a flange member (3a) extending in the radial direction and arranged in cooperation with said second bearing surface (7b) for guiding said gear wheels (1,2) in the axial direction thereof.

3. A force transmission arrangement according to claim 1, including a second slide bearing element (8) arranged between the engine block (6) and said second gear wheel (2) and arranged to guide said guiding element (3) in the radial direction and in addition said second gear wheel (2) in the axial direction.

4. A force transmission arrangement according to claim 1, wherein the fastening member is a screw bolt.

* * * * *